3,537,868
LOW EXPANSION CRYSTALLINE GLASS
Yoshio Kosaka, Tokyo, Japan, assignor to Kabushiki Kaisha Obara Kogaku Carasu, Kanagawa-ken, Japan
No Drawing. Filed July 25, 1968, Ser. No. 747,461
Claims priority, application Japan, July 27, 1967, 42/48,414
Int. Cl. C03c 3/22
U.S. Cl. 106—39      4 Claims

ABSTRACT OF THE DISCLOSURE

A low expansion crystalline glass is obtained by melting and forming glass consisting essentially of the following composition by weight and heat treating it: $SiO_2$ 50.0–80.0%, $Al_2O_3$ 10.0–35.0%, $Li_2O$ 1.5–10.0%, $Nb_2O_5$ 0–7.0%, $Ta_2O_5$ 0–7.0%, $TiO_2$ 0–10.0%, $ZrO_2$ 0–5.0%, ($Nb_2O_5+Ta_2O_5$) 0.1–7.0%, ($TiO_2+ZrO_2$) 0.1–10.0%, ($Nb_2O_5+Ta_2O_5+TiO_2+ZrO_2$) 1.0–15.0%, ($SiO_2+Al_2O_3+Li_2O+Nb_2O_5+Ta_2O_5+TiO_2+ZrO_2$)>90.0%.

---

A novel crystalline glass, excellent in resistance to thermal shock and in mechanical strength in addition to having an extremely low thermal expansion coefficient, is obtained by melting and forming $Li_2O$–$Al_2O_3$–$SiO_2$ system glass containing the nucleating agent which promotes crystallization and letting generate, by heating, a fine and uniform crystal matter having a very low thermal expansion coefficient in the glass.

It is well known that, in the past, $Li_2O$–$Al_2O_3$–$SiO_2$ system glass or $Li_2O$–$Al_2O_3$–$XmOn$–$SiO_2$ system glass (XmOn is one kind or more of indispensible oxide components) is used as the base glass, and, as the nucleating agent to be added thereto, $TiO_2$ (U.S.P. No. 3,157,522), $ZrO_2$ (U.S.P. No. 3,241,985, U.S.P. No. 3,252,811), $ZrO_2$+F (Japanese Patent Gazette 1963—10722, 1966—20832), $ZrO_2+P_2O_5$ (Japanese Patent Gazette 1963—3912), $TiO_2+ZrO_2+P_2O_5$ (U.S.P. No. 3,282,712), $Ag_2O+TiO_2$ (Japanese Patent Gazette 1965—14308), $TiO_2+Cr_2O_3$ (Japanese Patent Gazette 1966—14655, $ZrO_2+MoO_3$ (Japanese Patent Gazette 1967—5412), $ZrO_2+SnO_2$ (Japanese Patent Gazette 1967—9600), etc. have been added.

This invention relates to a new method of use different from the conventional methods of using a nucleating agent, and, as will be explained later, makes it possible to obtain transparent low expansion crystalline glass which is easy to melt.

To be more precise, one of the features of this invention is that the glass in question consists of the $$Li_2O–Al_2O_3–SiO_2$$

system glass to which is added, as the nucleating agent, a content consisting of one or two kinds of $Nb_2O_5$, $Ta_2O_5$ and weighing 0.1–7.0% in total by weight percent (Group A components) and another content consisting of one or two kinds of $TiO_2$, $ZrO_2$ and weighing 0.1–10.0% in total by weight percent (Group B components), letting them exist together.

The applicant has found that, by using a combination of the contents as described above, more crystallizing effect and more fine crystal particles creating effect can be obtained as compared with the conventional known method of using one or two kinds of Group B components ($TiO_2$, $ZrO_2$). This is considered due to a phenomenon wherein, during the heat treatment, a particular interaction is produced, in the glass, between Group A components and Group B components and this interaction serves to exert the effect as the nucleating agent. This invention makes it possible to obtain the desired crystalline glass by letting fine crystal particles generate uniformly in the glass during the heat treatment, utilizing the above mentioned effects.

There are, however, cases where, when one or two kinds of $Nb_2O_5$, $Ta_2O_5$ are added on $Li_2O$–$Al_2O_3$–$SiO_2$ system glass, the glass being heat treated separates out, as the main crystalline phase, β eucryptite or β spodumene. But, from the result of X-ray diffraction tests, it has been found that the amount of crystalline phase is only a little and that addition of the single Group A components is not practical as the nucleating agent. Then, another feature of this invention is as follows:

Namely, it is known that in the past, a transparent low expansion crystalline glass has been obtained by using a comparatively large amount of $ZrO_2$ as the nucleating agent (U.S.P. No. 3,241,985, U.S.P. No. 3,252,811). However, these actually require a very high temperature for melting glass and so are accompanied by various defects such as excessive erosion on the glass melting refractories, difficulty in melting and forming, etc. Furthermore, when a comparatively large amount of $ZrO_2$ is used as the nucleating agent, a considerable amount of a scum being difficult to melt is generated, while the glass is being melted, due to $ZrO_2$. Therefore, it is a known fact that F or $P_2O_5$ is added to increase the solubility of $ZrO_2$ into glass and thus to prevent generation of scum (Japanese Patent Gazette 1963—3912, 1963—10722, 1966—20832, U.S.P. No. 3,282,712). However, the crystalline glass obtainable in this case tends to become difficult to show a very low thermal expansion coefficient, and, furthermore, has another defect of tending to turn to a strong opacity. Therefore, by these methods, it is very difficult to obtain a transparent low expansion crystalline glass easy to melt. However, it has been made clear, by experiment, that these defects can be improved by using the nucleating agent covered by this invention. To be more precise, out of the combinations of Group A components and Group B components, combinations of $Nb_2O_5$ and ($TiO_2+ZrO_2$), $Ta_2O_5$ and ($TiO_2+ZrO_2$) or ($Nb_2O_5+Ta_2O_5$) and ($TiO_2+ZrO_2$) make it possible to obtain a more transparent low expansion crystalline glass than those obtainable by the conventional method of using one or two kinds of Group B components. Furthermore, it can increase the solubility of $ZrO_2$ into glass, under existence of Group A components especially $Nb_2O_5$. Therefore, generation of scum can be prevented under favorable melting conditions. (This is advantageous to let them generate an effect as the nucleating agent, under the heat treating process, by the interaction between Group A components and $ZrO_2$ in this invention.)

By using the combination of Group A components and Group B components other than above, as the nucleating agent, i.e., $Nb_2O_5$ and $TiO_2$, $Nb_2O_5$ and $ZrO_2$, $Ta_2O_5$ and $TiO_2$, $Ta_2O_5$ and $ZrO_2$, ($Nb_2O_5+Ta_2O_5$) and $TiO_2$, ($Nb_2O_5+Ta_2O_5$) and $ZrO_2$, the desired final product also can be obtained. But, the products in these cases have been confirmed, as the result of experiment, to tend to become semitransparent or opaque.

The compositions of the indispensable components of the glass to be used in this invention are, by weight percent, as shown in Table 1, where "Wide-range composition" is for cases where the appearance concerning transparency or non-transparency of the final product is not limited, and "Selected composition" is for ones chosen to obtain transparent final products.

TABLE 1

|  | Wide-range composition, percent | Selected composition, percent |
| --- | --- | --- |
| $SiO_2$ | 50.0–80.0 | 63.0–73.0 |
| $Al_2O_3$ | 10.0–35.0 | 15.0–27.0 |
| $Li_2O$ | 1.5–10.0 | 2.5–5.0 |
| $Nb_2O_5$ | 0–7.0 | 0–3.0 |
| $Ta_2O_5$ | 0–7.0 | 0–3.0 |
| $TiO_2$ | 0–10.0 | 1.0–3.0 |
| $ZrO_2$ | 0–5.0 | 1.0–3.0 |
| $(Nb_2O_5 + Ta_2O_5)$ | 0.1–7.0 | 0.2–3.0 |
| $(TiO_2 + ZrO_2)$ | 0.1–10.0 | 2.0–5.0 |
| $(Nb_2O_5+Ta_2O_5+TiO_2+ZrO_2)$ | 1.0–15.0 | 3.5–7.0 |
| $(SiO_2+Al_2O_3+Li_2O+Nb_2O_5+Ta_2O_5+TiO_2+ZrO_2)$ | >90.0 | >95.0 |

The reasons for limiting the range of composition of the indispensable components in this invention as above are as follows:

(1) Glass with $SiO_2$ and $Al_2O_3$ exceeding respectively 80.0% and 35.0% or $Li_2O$ below 1.5% is very difficult to melt and form.

(2) A glass with below 10.0% of $Al_2O_3$ or with over 10.0% of $Li_2O$ tends to become a crystalline glass having a high thermal expansion coefficient.

(3) A glass with below 50.0% of $SiO_2$ component or over 10.0% of $Li_2O$ component is liable to lose transparency while being formed and tends to become difficult to obtain crystalline glass having a high mechanical strength.

(4) Although, even if the total of one or two kinds of components in Group A components ($Nb_2O_5$, $Ta_2O_5$) contained in the glass is over 7.0% in the combination with Group B components, the desired final product can be obtained, it is too costly and is not so effective as to justify such a high percentage. Furthermore, use of one or two kinds of Group A components totalling less than 0.1% cannot bring about an effect as the nucleating agent in the combined use with Group B components in this invention.

(5) Although, even if the total of Group B components ($TiO_2$, $ZrO_2$) exceeds 10.0%, the desired final product can be obtained, when it exceeds 10.0% with the combination with Group A components in this invention, the glass tends to devitrify during forming or cooling. When one kind of Group B components is used in combination with Group A components, it is appropriate for up to 10.0% and up to 5.0%, respectively, for $TiO_2$ and $ZrO_2$, for the reasons mentioned above. Furthermore, a total of below 0.1% of Group B components is insufficient to attain the desired effects in the combination with Group A components.

(6) A glass having Group A components and Group B components totalling over 15.0% tends to devitrify during forming or cooling. Furthermore, at below 1.0%, it cannot show an effect as the nucleating agent.

(7) When the total of the indispensable components in this invention is below 90.0%, the formed glass object becomes liable to deform during the heat treatment.

Other subordinate components, for instance, $Na_2O$, $K_2O$, $BeO$, $MgO$, $CaO$, $SrO$, $BaO$, $ZnO$, $CdO$, $B_2O_3$, $PbO$, $Bi_2O_3$, etc., can be added in the glass composition in this invention to accelerate melting of the raw materials or to prevent the crack generating tendency often observed in the heat-treatment process of the glass, without changing the desired characteristic of the final product. However, their total amount should not be allowed to exceed 10.0% so as to prevent maintenance of the shape of the formed glass, formation of fine crystals in the glass during the heat treatment, etc., from being adversely affected thereby. Out of these subordinate additives, $NaO_2$, $K_2O$, $BeO$, $CaO$, $SrO$, $BaO$, $ZnO$, $CdO$, $PbO$ or $Bi_2O_3$ should preferably be held below 4.0% each and $MgO$ or $B_2O_3$ below 8.0% each.

$As_2O_3$ or $Sb_2O_3$ is effective as the refining agent during melting. If $Nb_2O_5$ or $Ta_2O_5$ exists in the glass together with $Sb_2O_3$, $SnO_2$ or $SnO$, the final product may sometimes take a blackish brown color, but does not give any large change to the desired characteristics.

Next, to obtain a transparent final product by melting the glass under favorable conditions, and making an advantageous control of growing of crystal particles in the glass during heat treatment, the composition of the glass is limited to the selected compositions shown in Table 1. In this case, the total amount of the added subordinate components should not be made to exceed 5.0%. Furthermore, out of subordinate components to be added, $Na_2O$, $K_2O$, $BeO$, $CaO$, $SrO$, $BaO$, $CdO$, $B_2O_3$, $PbO$ or $Bi_2O_3$ should not be made to exceed 2.0% each and $MgO$ or $ZnO$ 4.0% each.

In Table 2, Examples 1–13 are for wide-range compositions, and Examples 14–21 are for selected compositions to obtain transparent final products, both according to this invention. The glasses in reference Examples A–D, E–I and Examples 1–13 are manufactured by melting for 5–15 hours at a temperature of 1,400–1,650° C. and as can be understood from Table 3, are given various heat treating conditions of 1–5 hours at a temperature of 800–1,200° C. Furthermore, the glasses in Examples 14–21 are manufactured by melting for 10–15 hours at a temperature of 1,450–1,550° C. and, as can be seen from Table 3, are given various heat treating conditions of 1–5 hours at a temperature of 800–900° C. In Table 2, reference Examples A–D and Examples 1–5 are almost the same in contents as each other except that combination of Group A components and Group B components are changed with each other. And, in Table 3, they are given the same heat treating conditions. Reference Examples A, B, C and D are those with $Nb_2O_5$, $Ta_2O_5$, $TiO_2$ and $ZrO_2$ added independently and are shown for comparison with those according to this invention. In Table 2, reference Examples E–I and Examples 14–16 are almost the same as each other except that the nucleating agent is changed. And, in Table 3, they are given the same heat treating conditions. These are shown to compare the transparencies of the final products. These glasses have been heated and heat treated in the electric furnace. The temperature has been raised from room temperature to the heat treating temperature at a speed of 50° C./hour. It may be mentioned that reference Example D required, during melting of the glass, 6 hours at a temperature of 1,570° C. to melt the scum due to $ZrO_2$. But, in Examples 2, 3 and 5 the purpose has been accomplished advantageously in 6 hours at a temperature of 1,520° C. Furthermore, in reference Example F, it took 6 hours at a temperature of 1,620° C., and in reference Example G, it took 6 hours at a temperature of 1,590° C., while in Examples 14, 15 and 16, it took 6 hours at a temperature of 1,515° C., in reference Examples H and I, it took 6 hours at a temperature of 1,485° C., to attain its purposes.

It has been confirmed by X-ray diffraction test, that the sample after heat treatment in Table 3, in the examples, separates, in it, β eucryptite or β spodumene as the main crystalline phase. No crystalline phase has been confirmed in reference Examples A–D. The crystalline glasses obtained from the examples are all fine and uniform in the crystal grain condition, having a very low thermal expansion coefficient as compared with reference Examples A–D and a high mechanical strength, i.e., 2–5 times those in reference Examples A–D. The crystalline glasses obtained from the glass samples in Examples 14–21 are all transparent as against those in reference Examples E–I where the final products are semitransparent or opaque.

TABLE 2

| | Reference examples | | | | Examples | | | | | | | | | | | | | |
|---|---|---|---|---|---|---|---|---|---|---|---|---|---|---|---|---|---|---|
| | A | B | C | D | 1 | 2 | 3 | 4 | 5 | 6 | 7 | 8 | 9 | 10 | 11 | 12 | 13 |
| $SiO_2$ | 69.5 | 69.5 | 71.0 | 71.0 | 69.5 | 70.0 | 69.0 | 70.0 | 69.0 | 69.0 | 65.0 | 78.7 | 66.7 | 53.0 | 69.0 | 65.5 | 67.0 |
| $Al_2O_3$ | 18.0 | 18.0 | 18.5 | 18.5 | 18.0 | 18.0 | 18.0 | 18.0 | 17.0 | 17.0 | 20.0 | 11.0 | 23.0 | 31.8 | 22.0 | 19.0 | 16.0 |
| $Li_2O$ | 3.0 | 3.0 | 3.0 | 3.0 | 3.0 | 3.0 | 3.0 | 3.0 | 3.0 | 4.0 | 3.0 | 5.5 | 4.0 | 9.0 | 2.0 | 3.5 | 4.5 |
| $Nb_2O_5$ | 4.0 | | | | 2.5 | 2.5 | | | 3.5 | 1.0 | 1.0 | 2.5 | | | 3.0 | 1.5 | 5.0 |
| $Ta_2O_5$ | | 4.0 | | | | | 2.5 | 2.0 | | 0.5 | 1.0 | 0.5 | 3.0 | 0.1 | 1.5 | 5.0 | |
| $TiO_2$ | | | 1.8 | | 1.5 | | | 1.5 | | 1.0 | 0.5 | 0.8 | | 0.5 | 0.3 | | 7.0 |
| $ZrO_2$ | | | | 1.5 | | 1.5 | 1.5 | | 3.0 | 1.0 | 1.5 | | 0.3 | 0.1 | 1.0 | 4.5 | |
| $Na_2O$ | 1.0 | 1.0 | 1.0 | 1.0 | 0.9 | 0.9 | 1.0 | 1.0 | 0.9 | 1.0 | 2.0 | 0.5 | | | 0.7 | | |
| $MgO$ | 1.5 | 1.5 | 1.7 | 2.0 | 1.8 | 1.8 | 1.5 | 1.5 | 1.3 | 2.0 | 2.0 | | 1.5 | 1.5 | 1.0 | 1.5 | |
| $BaO$ | | | | | | | | | | 1.0 | 1.0 | | 1.0 | 0.5 | 0.3 | 0.5 | |
| $B_2O_3$ | 2.0 | 2.0 | 2.0 | 2.0 | 1.8 | 1.8 | 2.0 | 2.0 | 1.8 | 2.0 | 2.0 | | | | | | |
| $As_2O_3$ | 0.5 | 0.5 | 0.5 | 0.5 | 0.5 | | 0.5 | 0.5 | | | 0.5 | | 0.5 | 0.5 | 0.5 | | |
| $Sb_2O_3$ | 0.5 | 0.5 | 0.5 | 0.5 | 0.5 | 0.5 | 0.5 | 0.5 | 0.5 | 0.5 | | 0.5 | | | | 0.2 | 0.5 | 0.5 |

| | Reference examples | | | | | Examples | | | | | | | |
|---|---|---|---|---|---|---|---|---|---|---|---|---|---|
| | E | F | G | H | I | 14 | 15 | 16 | 17 | 18 | 19 | 20 | 21 |
| $SiO_2$ | 68.9 | 68.9 | 68.9 | 68.7 | 68.7 | 68.3 | 67.0 | 68.0 | 66.8 | 72.5 | 64.0 | 67.5 | 67.0 |
| $Al_2O_3$ | 19.0 | 19.0 | 19.0 | 18.5 | 19.0 | 18.5 | 19.8 | 19.5 | 23.0 | 17.0 | 24.0 | 21.0 | 21.5 |
| $Li_2O$ | 3.8 | 3.8 | 3.8 | 3.8 | 3.8 | 3.8 | 3.8 | 3.8 | 4.5 | 4.0 | 3.0 | 4.0 | 4.8 |
| $Nb_2O_5$ | | | | | | 2.5 | | 1.5 | 0.5 | 2.5 | 2.0 | | 1.3 |
| $Ta_2O_5$ | | | | | | | 2.5 | 0.5 | 0.2 | | 1.0 | 2.5 | 1.2 |
| $TiO_2$ | 4.5 | | | 1.8 | 1.8 | 1.8 | 1.8 | 1.8 | 1.8 | 1.0 | 1.2 | 1.8 | 1.5 |
| $ZrO_2$ | | 4.5 | 2.7 | 2.7 | 2.7 | 1.8 | 1.8 | 1.8 | 1.7 | 1.8 | 1.3 | 1.2 | 1.7 |
| $F$ | | | | | 1.5 | | | | | | | | |
| $P_2O_5$ | | | | | 2.0 | | | | | | | | |
| $Na_2O$ | 1.0 | 1.0 | 1.0 | 1.0 | 1.0 | 1.0 | 0.8 | 0.8 | 0.5 | | 1.0 | 0.5 | |
| $MgO$ | 1.0 | 1.0 | 1.0 | 0.5 | 0.5 | 0.5 | 1.0 | 0.5 | 0.5 | 0.7 | 0.5 | 0.7 | 0.5 |
| $BaO$ | 0.8 | 0.8 | 0.8 | 0.5 | 0.5 | 0.8 | 0.5 | 0.8 | | | 1.0 | 0.5 | |
| $B_2O_3$ | 0.5 | 0.5 | 0.5 | | | 0.5 | 0.5 | 0.5 | | | | | |
| $As_2O_3$ | | | | | | | | | | 0.3 | 0.3 | | |
| $Sb_2O_3$ | 0.5 | 0.5 | 0.5 | 0.5 | 0.5 | 0.5 | 0.5 | 0.5 | 0.5 | 0.2 | 0.7 | 0.3 | 0.5 |

TABLE 3

| | Reference examples | | | | Examples | | | | | | | | | | | | | |
|---|---|---|---|---|---|---|---|---|---|---|---|---|---|---|---|---|---|---|
| | A | B | C | D | 1 | 2 | 3 | 4 | 5 | 6 | 7 | 8 | 9 | 10 | 11 | 12 | 13 |
| Glass expansion, $\times 10^{-7}/°C$ (100–300°C) | 37 | 36 | 34 | 33 | 36 | 34 | 33 | 33 | 35 | 44 | 42 | 46 | 41 | 69 | 30 | 33 | 40 |
| Heat treatment: Temp. (°C) | | 850 | | | | 850 | | | | 1,200 | 810 | 950 | 1,000 | 950 | 850 | 850 | 1,050 |
| Time (hrs.) | | 2 | | | | 2 | | | | 2 | 5 | 3 | 1 | 2 | 3 | 2 | 2 |
| Heat treated specimen: Expansion $\times 10^{-7}/°C$ (100–300°C) | 37 | 36 | 34 | 33 | 4 | 2 | 2 | 7 | 3 | 3 | 8 | 21 | 9 | −6 | −1 | 7 | 15 |
| Bending strength (kg./cm.²) | 520 | 480 | 500 | 520 | 1,200 | 1,450 | 1,400 | 900 | 1,600 | 950 | 1,330 | 2,050 | 2,200 | 1,550 | 1,100 | 1,600 | 1,800 |
| Chief crystalline phase | Non | Non | Non | Non | βE | βE | βE | βE | βE | βS | βE | βS | βE | βE | βE | βE | βS |
| Appearance | T | T | T | T | O | O | O | O | ST | O | ST | O | O | O | ST | ST | O |

| | Reference examples | | | | | Examples | | | | | | | |
|---|---|---|---|---|---|---|---|---|---|---|---|---|---|
| | E | F | G | H | I | 14 | 15 | 16 | 17 | 18 | 19 | 20 | 21 |
| Glass expansion, $\times 10^{-7}/°C$ (100–300°C) | 43 | 38 | 40 | 46 | 47 | 41 | 42 | 41 | 44 | 39 | 37 | 43 | 47 |
| Heat treatment: Temp. (°C) | | 830 | | | | 830 | | | 815 | 870 | 830 | 850 | 850 |
| Time (hrs.) | | 5 | | | | 5 | | | 5 | 2 | 3 | 2 | 2 |
| Heat treated specimen: Expansion, $\times 10^{-7}/°C$ (100–300°C) | −4 | −8 | −5 | 9 | 18 | −1 | −2 | −1 | −6 | −4 | 6 | 0 | −8 |
| Bending strength (kg./cm.²) | 1,030 | 910 | 1,360 | 1,830 | 2,120 | 1,400 | 1,100 | 1,180 | 1,480 | 1,260 | 1,020 | 1,530 | 1,650 |
| Main crystalline phase | βE | βE | βE | βE | βS | βE | βE | βE | βE | βE | βE | βE | βE |
| Appearance | O | O | ST | O | O | T | T | T | T | T | T | T | T |

NOTES.—βE, β eucyrptite; βS, β spodumene; T, transparent; ST, semi-transparent; O, opaque.

The glass having the composition of this invention can be made, by making an appropriate heat treatment on it, to generate a unique accelerating action toward crystallization inside of it and generate fine and uniform particles in crystal condition of β eucryptite or β spodumene, and, therefore, it becomes possible to obtain a transparent, semitransparent or opaque crystalline glass having a very low thermal expansion coefficient, an excellent resistance to thermal shock and a high mechanical strength. Despite some examples of embodiment having been described above, it is clear that the present invention is not to be limited to these examples of application, but can be variously modified within the scope of the spirit of invention indicated in the patent claims.

What is claimed is:

1. Low expansion crystalline glass obtained by melting and forming and thereafter heat treating glass consisting essentially of the following composition by weight:

| | Percent |
|---|---|
| $SiO_2$ | 50.0–80.0 |
| $Al_2O_3$ | 10.0–35.0 |
| $Li_2O$ | 1.5–10.0 |
| $Nb_2O_5$ | 0–7.0 |
| $Ta_2O_5$ | 0–7.0 |
| $TiO_2$ | 0–10.0 |
| $ZrO_2$ | 0–5.0 |
| $(Nb_2O_5+Ta_2O_5)$ | 0.1–7.0 |
| $(TiO_2+ZrO_2)$ | 0.1–10.0 |
| $(Nb_2O_5+Ta_2O_5+TiO_2+ZrO_2)$ | 1.0–15.0 |
| $(SiO_2+Al_2O_3+Li_2O+Nb_2O_5+Ta_2O_5+TiO_2+ZrO_2)$ | >90.0 |

2. Transparent low expansion crystalline glass obtained by melting and forming and thereafter heat treating glass consisting essentially of the following composition by weight:

| | Percent |
|---|---|
| $SiO_2$ | 63.0–73.0 |
| $Al_2O_3$ | 15.0–27.0 |
| $Li_2O$ | 2.5–5.0 |
| $Nb_2O_5$ | 0–3.0 |
| $Ta_2O_5$ | 0–3.0 |
| $TiO_2$ | 1.0–3.0 |
| $ZrO_2$ | 1.0–3.0 |
| $(Nb_2O_5+Ta_2O_5)$ | 0.2–3.0 |
| $(TiO_2+ZrO_2)$ | 2.0–5.0 |
| $(Nb_2O_5+Ta_2O_5+TiO_2+ZrO_2)$ | 3.5–7.0 |
| $(SiO_2+Al_2O_3+Li_2O+Nb_2O_5+Ta_2O_5+TiO_2+ZrO_2)$ | >95.0 |

3. The manufacturing process for low expansion crystalline glasses, consisting of melting the glass having composition of claim 1 above, for 5–15 hours at a temperature of 1,400–1,650° C. and, then, after forming it into the desired shape, heat treating it for 1–5 hours at a temperature of 800–1,200° C.

4. The manufacturing process for transparent low expansion crystalline glasses, consisting of melting the glass having composition of claim 2 above, for 10–15 hours at a temperature of 1,450–1,550° C., and, then, after forming it into the desired shape, heat treating it for 1–5 hours at a temperature of 800–900° C.

References Cited
UNITED STATES PATENTS

| 3,275,493 | 9/1966 | MacDowell | 106—39 |
| 3,252,811 | 5/1966 | Beall | 106—39 |
| 3,282,712 | 11/1966 | Tashiro et al. | 106—39 |
| 3,352,698 | 11/1967 | McMillan et al. | 106—39 |
| 3,380,818 | 4/1968 | Smith | 106—39 |
| 3,463,647 | 8/1969 | Kosiorek | 106—39 |

HELEN M. McCARTHY, Primary Examiner

U.S. Cl. X.R.

65—33; 106—52